(12) United States Patent
Holling

(10) Patent No.: US 7,026,785 B1
(45) Date of Patent: Apr. 11, 2006

(54) MOTOR CONTROLLER

(75) Inventor: George Holling, Riverton, UT (US)

(73) Assignee: RT Patent Company, Inc., Wilmington, DE (US)

( * ) Notice: Subject to any disclaimer, the term of this patent is extended or adjusted under 35 U.S.C. 154(b) by 0 days.

(21) Appl. No.: 10/885,103

(22) Filed: Jul. 7, 2004

(51) Int. Cl.
*H02P 5/34* (2006.01)

(52) U.S. Cl. .................. 318/807; 318/767; 318/779

(58) Field of Classification Search ............ 318/807, 318/808, 803, 767, 779
See application file for complete search history.

(56) References Cited

U.S. PATENT DOCUMENTS

| | | | | |
|---|---|---|---|---|
| 3,775,652 A | * | 11/1973 | Bowler et al. ............... | 363/80 |
| 3,851,234 A | * | 11/1974 | Hoffman et al. ............. | 318/800 |
| 3,983,463 A | * | 9/1976 | Nabae et al. ................ | 318/803 |
| 4,091,294 A | * | 5/1978 | Zankl et al. ................. | 318/773 |
| 4,207,510 A | * | 6/1980 | Woodbury .................. | 318/802 |
| 4,538,100 A | * | 8/1985 | Tuten et al. ................. | 318/808 |
| 4,600,872 A | * | 7/1986 | Shepard, Jr. ................ | 318/658 |
| 5,206,575 A | | 4/1993 | Nakamura et al. .......... | 318/807 |
| 6,124,697 A | * | 9/2000 | Wilkerson .................. | 318/798 |
| 6,690,139 B1 | | 2/2004 | Seibel ....................... | 318/798 |

* cited by examiner

*Primary Examiner*—Rita Leykin
(74) *Attorney, Agent, or Firm*—Jones Day

(57) ABSTRACT

A system and method for controlling an electric motor is disclosed. The method comprises determining the operating load of the electric motor and then calculating the voltage to be applied to the electric motor in response to the operating load. The voltage to be applied operates the motor in an efficient manner for the given load. The frequency of the voltage to be applied to the electric motor is calculated in response to the operating load such that the frequency of the voltage to be applied operates the motor in an efficient manner. Power is applied to the motor with the voltage and frequency calculated in order to operate the motor in an efficient manner for the given load.

23 Claims, 3 Drawing Sheets

MOTOR CONTROLLER

FIELD OF THE INVENTION

The present invention generally relates to controllers for electric motors and more specifically to a controller which can vary the voltage and frequency of the power applied to the motor in order to obtain maximum efficiency at any load.

BACKGROUND OF THE INVENTION

Controllers for electric motors provide electrical energy to the motor for proper operation. Typically, the controller applies a voltage to the motor at a prescribed frequency. The voltage and the frequency are chosen to optimize the speed and torque output of the motor.

It has been shown that with an AC induction motor, the torque output of the motor can be improved if an over-voltage condition is applied. During this condition, the motor is operated in a partial saturation condition due to the magnetization current at low loads. However, the efficiency of the motor is decreased at lower speeds when operated in the over-voltage condition.

Referring to FIG. 1, a graph showing the efficiency of an AC induction motor operating in various conditions is shown. In FIG. 1, line 10 illustrates the efficiency of a standard AC induction motor operating in an over-voltage condition. As can be seen, the efficiency of the motor is low (i.e., approx. 50–75%) at low load conditions and the efficiency increases as the load increases. An AC induction motor operating normally is shown as line 12 and as can be seen, the efficiency of the motor is greatest at low load conditions and decreases as the load on the motor increases.

Currently, motor controllers can use vector controls for operating the motor at maximum efficiency. Vector controls are complex mathematical formulas which model the operation of the motor and use real-time monitoring of the motor. Specifically, the vector controls are a closed-loop feedback system that control the phase relationships between the input voltages. In order for the vector control to be effective, very sensitive measurements of the operating parameters of the motor are needed. In this respect, vector controls require very sensitive and expensive sensors to measure the operation of the motor.

Accordingly, there is a need for a motor controller to operate an electric motor in an efficient manner at different load conditions without the use of sensitive or complex control techniques.

SUMMARY OF THE INVENTION

A controller is disclosed for operating an electric motor having a rotational speed and using electrical current. The controller has a voltage controller for generating a voltage control signal in response to the speed and current usage of the motor wherein the voltage control signal represents an efficient operating mode of the motor. Furthermore, the controller has a frequency controller for generating a frequency control signal in response to the speed and current usage of the motor wherein the frequency control signal represents an efficient operating mode of the motor. The controller further includes a multiplier for combining the frequency control signal and the voltage control signal. The combined signal from the multiplier is applied to the voltage operating the motor such that the motor operates in an efficient manner for the given load.

A method for controlling an electric motor includes generating a voltage control signal in response to the speed (rotational frequency) of the motor and the current usage of the electric motor wherein the voltage control signal represents an efficient operating mode of the motor. Furthermore, a frequency control signal is generated in response to the speed of the motor and the current usage of the motor wherein the frequency control signal represents an efficient operating mode of the motor. The frequency and voltage control signals are combined and applied to the voltage operating the motor so that the motor operates efficiently for a given load.

A system for controlling an electric motor includes a speed sensor for measuring the rotational speed (rotational frequency) of the electric motor and generating a speed sensing signal in response thereto. The system further includes a current sensor for generating a current sensing signal in response to the current usage of the motor. A voltage controller of the system generates a voltage control signal in response to the speed sensing signal and the current sensing signal. The voltage control signal represents an efficient operating mode of the motor. Similarly, a frequency controller of the system generates a frequency control signal in response to the speed sensing signal and the current sensing signal. The frequency control signal also represents an efficient operating mode of the motor. The system further includes a multiplier for combining the frequency control signal and the voltage control signal. The combined signal is then applied to the voltage operating the motor.

A method for controlling an electric motor comprises determining an operating load of the electric motor. The voltage to be applied to the electric motor is then calculated in response to the load. The calculated voltage operates the motor in an efficient mode. Similarly, the frequency of the voltage that operates the electric motor is calculated in response to the operating load of the electric motor. The frequency of the voltage is calculated such that the motor operates in an efficient mode. The calculated voltage is applied to the motor at the calculated frequency in order to operate the motor in an efficient manner.

BRIEF DESCRIPTION OF THE DRAWINGS

These, as well as other features of the present invention, will become more apparent upon reference to the drawings wherein.

DETAILED DESCRIPTION

Figure 2:
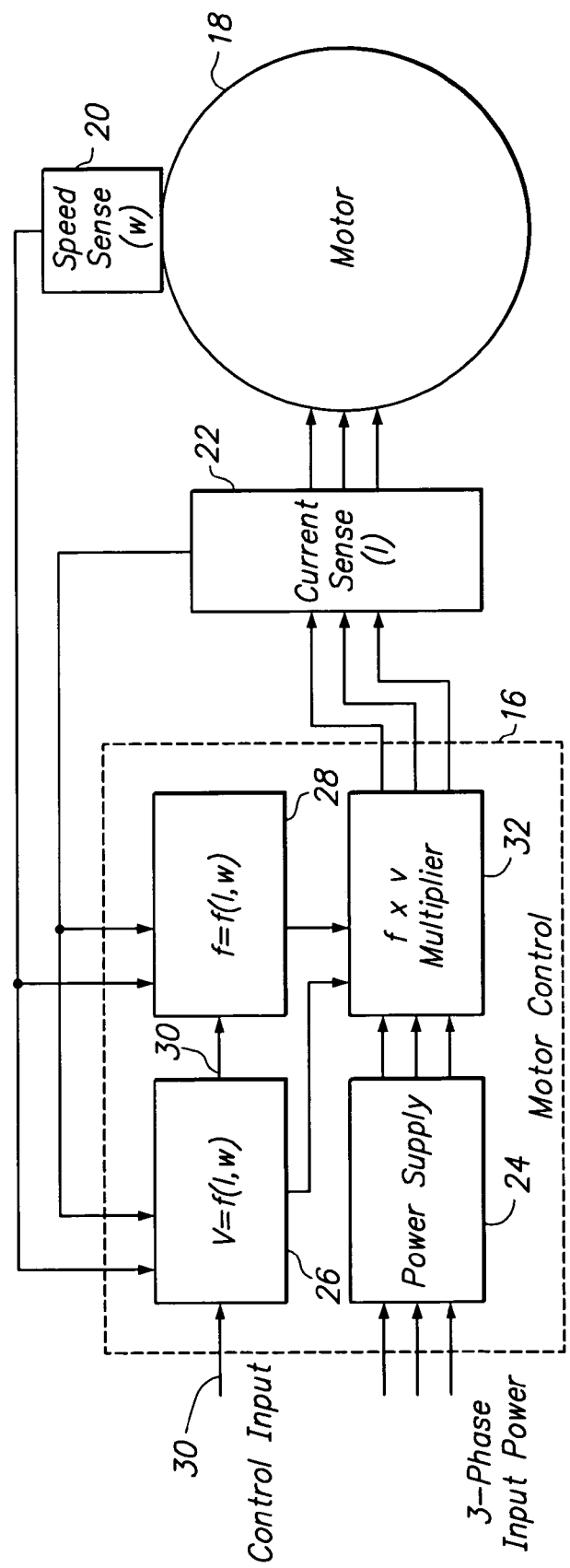
FIG. 2 is a block level diagram of a motor controller.

Referring now to the drawings wherein the showings are for purposes of illustrating preferred embodiments, and not for purposes of limiting the same, FIG. 2 is a block level diagram of a motor controller 16 used to control the operation of a 3-phase AC induction motor 18. The motor 18 may be a conventional AC induction type motor, or a motor operative with an increased gap as described by Assignees co-pending patent applications Ser. No. 10/821,787, and Ser. No. 10/894,688, the contents of which are incorporated herein by reference.

The load of the motor is determined with a speed sense 20 and a current sense 22. Specifically, the speed sense 20 measures the rotational speed ($\omega$) of the motor 18 through either a sensor or sensorless detection mechanism, as is commonly known. The speed sense 20 generates a speed sensing signal that is related to the rotational speed ($\omega$). Similarly, the current sense 22 measures the electrical current (I) that the motor 18 is using. For a three phase motor, the current sense 22 measures the RMS phase currents for each phase. The current sense 22 generates a current sensing signal that represents the total current (I) that the motor is using. In this regard, the current (I) and rotational speed ($\omega$) indicate the load being placed on the motor 18.

The controller 16 uses the current (I) and the speed ($\omega$) to determine the frequency and the amount of the voltage to be applied to the motor 18 such that the motor 18 operates in an efficient manner. The controller 16 has a power supply 24 to generate a regulated voltage that is applied to the motor 18. For the example shown in FIG. 2, the AC induction motor 18 is a three-phase motor. Accordingly, the power supply 24 regulates 3-phase input power that is applied to the motor 18.

The controller 16 has a voltage controller 26 that produces a voltage control signal in response to the speed ($\omega$) and current (I) of the motor. Specifically, the speed sensing signal from the speed sense 20 and the current sensing signal from the current sense 22 are input into the voltage controller 26. As previously discussed, the load on the motor 18 can be determined from the current usage and speed of the motor 18. The voltage controller 26 determines the amount of voltage that should be applied to the motor 18 based on the current sensing signal and the speed sensing signal to achieve the maximum efficiency of the motor 18.

Similarly, the controller 16 has a frequency controller 28 for regulating the frequency of the applied voltage. The speed sensing signal from the speed sense 20 and the current sensing signal from the current sense 22 are input into the frequency controller 26. The frequency controller 28 determines the frequency of the voltage to be applied to the motor 18 based on the current sensing signal and the speed sensing signal to achieve the maximum efficiency of the motor 18.

The frequency controller 28 and the voltage controller 26 determine the frequency and amount of voltage to be applied based upon the load and efficiency of the motor 18. Specifically, each of the controllers 26, 28 has a voltage/frequency curve for each operating speed of the motor 18. The voltage/frequency curve may be expressed as a mathematical formula or as a table containing values. The voltage/frequency curve is determined through either experimental testing of the motor 18 to determine the amount of voltage and frequency to be applied to obtain the maximum efficiency, or by stimulating the motor 18 to obtain the curves.

The voltage/frequency curves (e.g., voltage as a function of rotational speed) maximize the efficiency of the motor by over exciting the motor at higher loads. In this respect, the maximum efficiency of the motor is obtained at any load and the motor will operate at maximum efficiency over it full range of torque at any speed. The frequency of the voltage applied to the motor is controlled to allow the motor to operate at a speed that limits the internal saturation of the motor's steel and thus maximize the motor's operating frequency. Also, the motor's efficiency is improved by reducing the operating voltage of the motor when it is operated at a constant speed below the motor's rated torque. The voltage/frequency curves (e.g., voltage as a function of rotational speed) take into account the motor's operating characteristics in order to determine the amount of voltage and the frequency that the voltage should be applied in order to operate the motor 18 efficiently. A control input 30 allows an operator to vary the curves and operate the motor at a desired setting.

Figure 1:
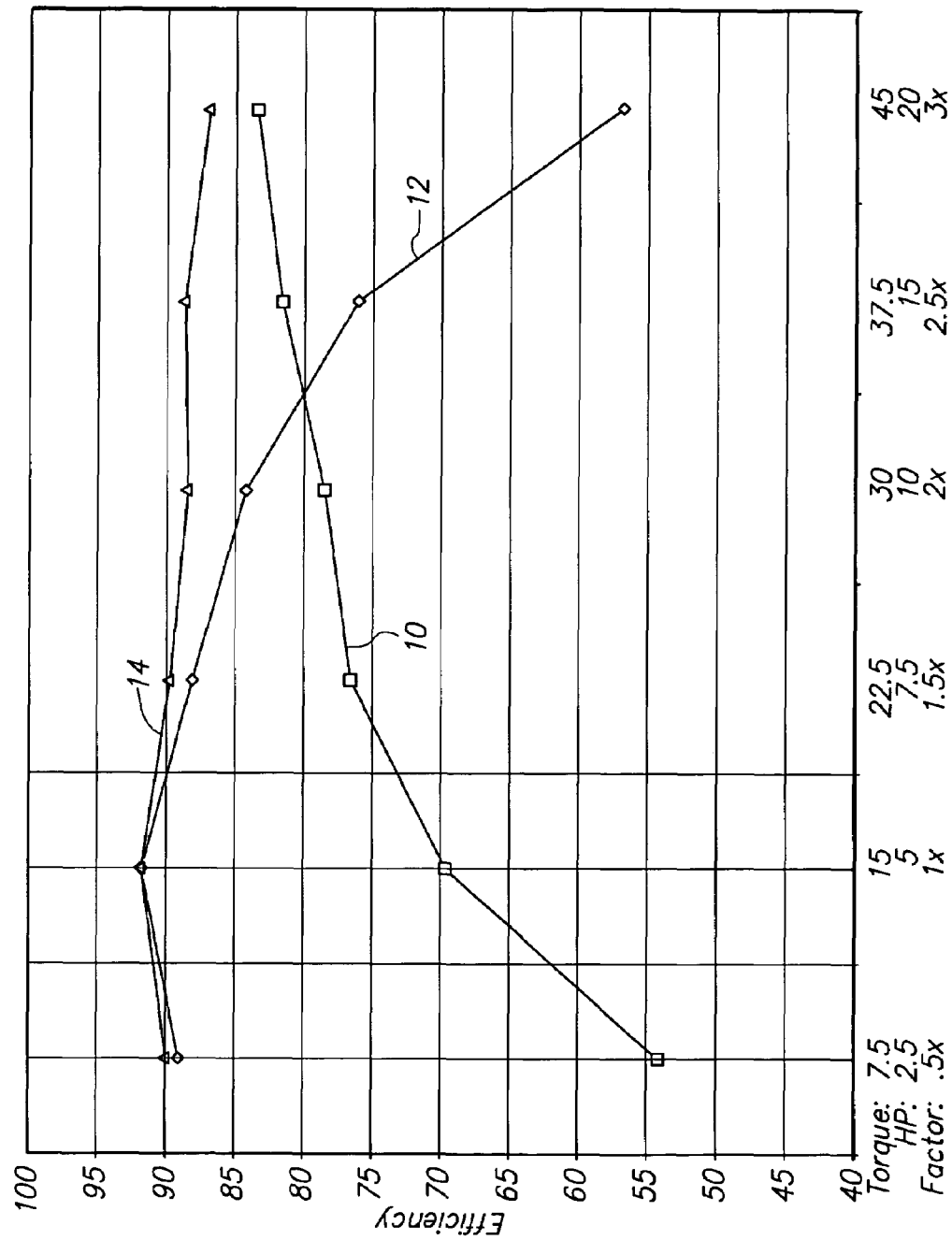
FIG. 1 is a graph showing the efficiency of an electric motor versus the operating load of the motor.

The voltage control signal from the voltage controller 26 and the frequency control signal from the frequency controller 28 are inputted into a signal multiplier 32 which combines the signals together. The multiplier 32 applies the controls signals to the power from the power supply 24 in order to control the frequency and voltage of the power supplied to the motor 18. Specifically, the multiplier 32 regulates the power from the power supply 24 in response to the voltage control signal and the frequency control signal. In this regard, the power applied to the electric motor 18 will operate the motor efficiently for the given load. Referring to FIG. 1, line 14 illustrates the efficiency of a motor using the controller 16. The motor operates between about 85%–95% efficiency using the controller 16 for all operating loads.

Figure 3:
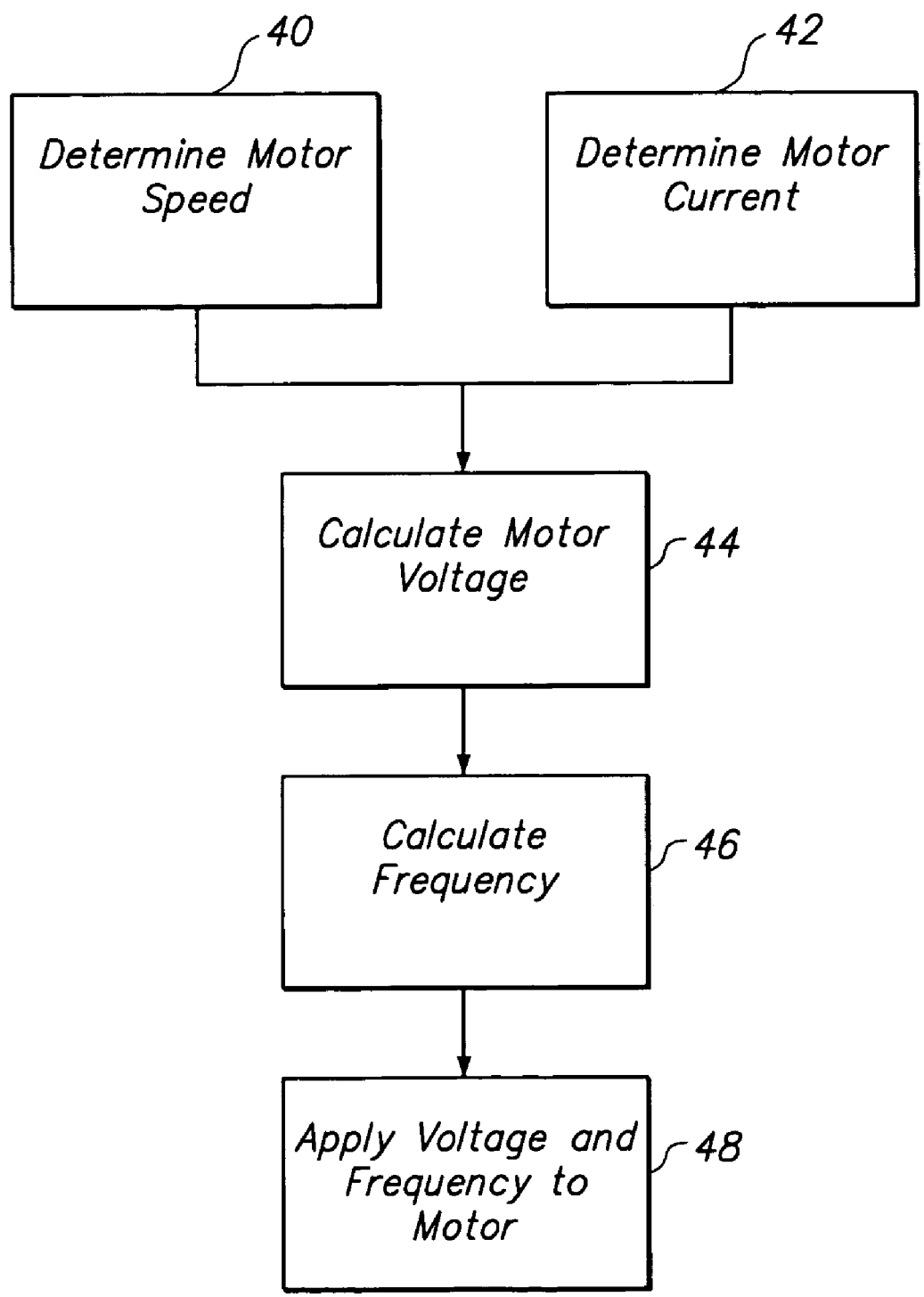
FIG. 3 is a flowchart illustrating the method of controlling an electric motor with the motor controller illustrated in FIG. 2.

Referring to FIG. 3, a flowchart showing the operation of the controller 16 is shown. In steps 40 and 42, the load on the motor 18 is determined. Specifically, in step 40, the speed of the motor 18 is determined, while in step 42, the current that the motor 18 is using is determined. In step 44, the voltage that should be applied to the motor is calculated by the voltage controller 26. In step 46, the frequency of the voltage that is applied to the motor 18 is calculated by the frequency controller 28. The calculated voltage and frequency are applied to the motor 18 in step 48.

It will be recognized by those of ordinary skill in the art that the controller 16 can be embodied as either discrete electronic components or as instructions performed on a multipurpose computer. In this regard, it is possible that the method as illustrated in FIG. 3 can be embodied as programming instructions stored on a computer-readable medium (i.e., disk drive, memory, etc. . . . ) that are implemented on a processor or processor containing system. Similarly, the voltage controller 26, frequency controller 28 and the multiplier 32 may be implemented as instructions or programming modules of a computer program.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalents thereof are intended to be embraced.

What is claimed is:

1. A controller for an electric motor with a rotational speed and using electrical current, comprising:
 a voltage controller for generating a voltage control signal in response to the speed and the current usage of the motor wherein the voltage control signal represents an efficient operating mode of the motor, wherein the voltage control signal is based on a physical relationship between maximum efficiency and the speed and current usage of the electric motor; and
 a frequency controller for generating a frequency control signal in response to the speed and current usage of the motor wherein the frequency control signal represents an efficient operating mode of the motor, wherein the frequency control signal is based on the physical relationship between maximum efficiency and the speed and current usage of the electric motor,
 a multiplier for combining the frequency control signal and the voltage control signal such that the combined signal is applied to the voltage operating the motor.

2. The controller of claim 1 wherein the frequency controller is configured to control the frequency of the motor in order to limit saturation of the motor.

3. The controller of claim 1 wherein the physical relationship is represented by a voltage/frequency curve for each operating load of the motor, the voltage/frequency curve being configured to determine the operating voltage for the motor in order to maximize efficiency at a particular load condition.

4. The controller of claim 1 wherein the motor has a speed sensor operative to generate a speed sensing signal and the voltage controller is configured to generate the voltage control signal in response to the speed sensing signal.

5. The controller of claim 1 wherein the motor has a current sensor operative to generate a current sensing signal and the voltage controller is configured to generate the voltage control signal in response to the current sensing signal.

6. The controller of claim 1 wherein the motor has a current sensor operative to generate a current sensing signal and a speed sensor operative to generate a speed sensing signal, and the voltage and frequency controllers are configured to generate a respective voltage control signal and frequency control signal in response to the current sensing signal and the speed sensing signal.

7. The controller of claim 6 wherein the frequency controller and the voltage controller are configured to operate an AC induction motor.

8. A method of controlling an electric motor, the method comprising the following steps:
 generating a voltage control signal in response to a speed of the motor and a current usage of the motor wherein the voltage control signal represents an efficient operating mode of the motor,
 the voltage control signal being generated based on a physical relationship between maximum efficiency and the speed and current usage of the electric motor for a specific load condition;
 generating a frequency control signal in response to the speed of the motor and the current usage of the motor wherein the frequency control signal represents an efficient operating mode of the motor,
 the frequency control signal being generated based on the physical relationship between maximum efficiency and the speed and current usage of the electric motor for the specific load condition; and
 combining the voltage control signal and the frequency control signal and applying the combined signal to the voltage operating the motor such that the motor operates efficiently for the given load.

9. The method of claim 8 further comprising the step of determining a speed of the motor with a speed sensor prior to generating the voltage and frequency control signals for the specific load condition.

10. The method of claim 9 further comprising the step of determining the current usage of the motor with a current sensor prior to generating the voltage and frequency control signals for the specific load condition.

11. The method of claim 8 further comprising the step of applying the voltage to an AC induction motor.

12. The method of claim 11 further comprising the step of applying the voltage to a three-phase AC induction motor.

13. A system for controlling the speed of an electric motor, the system comprising:
 a speed sensor for measuring the rotational speed of the electric motor and generating a speed sensing signal;
 a current sensor for measuring the current usage of the electric motor and generating a current sensing signal;
 a voltage controller for generating a voltage control signal in response to the speed sensing signal and the current sensing signal wherein the voltage control signal represents an efficient operating mode of the motor,
 the voltage controller being configured to generate the voltage control signal based on a physical relationship between maximum efficiency and the rotational speed and current usage of the electric motor for a specific load condition;
 a frequency controller for generating a frequency control signal in response to the speed sensing signal and the current sensing signal wherein the frequency control signal represents an efficient operating mode of the electric motor,
 the frequency controller being configured to generate the frequency control signal based on the physical relationship between maximum efficiency and the rotational speed and current usage of the electric motor for the specific load condition;
 a multiplier for combining the frequency control signal and the voltage control signal such that the combined signal is applied to the voltage operating the motor.

14. The system of claim 13 wherein the physical relationship is represented by a voltage/frequency curve for the operating loads of the motor, the voltage/frequency curve being configured to determine the operating voltage for the motor in order to maximize efficiency for the specific load condition.

15. The system of claim 13 wherein the motor is an AC induction motor.

16. The system of claim 13 wherein the motor is a three-phase AC induction motor.

17. A method for controlling an electric motor, the method comprising the following steps:
 determining the operating load of the electric motor;
 calculating the voltage to be applied to the electric motor in response to the operating load wherein the voltage operates the motor at an efficient mode;
 the voltage being calculated based on a physical relationship between maximum efficiency and a specific operating load of the electric motor;
 calculating the frequency of the voltage to be applied to the electric motor in response to the operating load wherein the frequency of the voltage to be applied operates the voltage in the efficient mode;

the frequency being calculated based on the physical relationship between maximum efficiency and the specific operating load of the electric motor;

applying the voltage of the frequency calculated in order to operate the motor in the efficient mode.

18. The method of claim 17 further comprising the step of determining the operating load of the electric motor by determining the speed of the electric motor and the current usage of the electric motor.

19. The method of claim 18 wherein the step of calculating the voltage applied to the electric motor comprises determining the voltage with a voltage/frequency curve for the operating load.

20. The method of claim 18 wherein the step of calculating the frequency of the voltage applied to the electric motor comprises determining the frequency with a voltage/frequency curve for the specific operating load.

21. The controller of claim 17 wherein the AC induction motor is a three-phase induction motor.

22. The controller of claim 3, wherein voltage/frequency curve is expressed as a mathematical formula.

23. The controller of claim 3, wherein voltage/frequency curve is expressed using values stored in a look-up table.

* * * * *